(12) United States Patent
Penet

(10) Patent No.: US 10,562,221 B2
(45) Date of Patent: Feb. 18, 2020

(54) MOLDING UNIT FOR CONTAINERS, EQUIPPED WITH A BOXING DEVICE HAVING AN ADDED SLEEVE

(71) Applicant: SIDEL PARTICIPATIONS, Octeville-sur-Mer (FR)

(72) Inventor: Laurent Penet, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 279 days.

(21) Appl. No.: 15/655,275

(22) Filed: Jul. 20, 2017

(65) Prior Publication Data
US 2018/0022009 A1 Jan. 25, 2018

(30) Foreign Application Priority Data

Jul. 21, 2016 (FR) ...................................... 16 56947

(51) Int. Cl.
| | | |
|---|---|---|
| *B29C 49/48* | (2006.01) | |
| *B29C 49/20* | (2006.01) | |
| *B29C 49/78* | (2006.01) | |
| *B29K 67/00* | (2006.01) | |

(52) U.S. Cl.
CPC .......... *B29C 49/4815* (2013.01); *B29C 49/20* (2013.01); *B29C 49/783* (2013.01); *B29C 2049/2086* (2013.01); *B29C 2049/4807* (2013.01); *B29C 2049/4812* (2013.01); *B29K 2067/003* (2013.01)

(58) Field of Classification Search
CPC ............................ B29C 49/4815; B29C 49/20
See application file for complete search history.

(56) References Cited

U.S. PATENT DOCUMENTS

2014/0263161 A1* 9/2014 Guerin ............... B29C 49/4815
                                                           215/384

FOREIGN PATENT DOCUMENTS

| EP | 0 626 248 A1 | 11/1994 |
|---|---|---|
| JP | H08-66959 A | 3/1996 |
| JP | 3074616 B2 * | 8/2000 |
| WO | 2010/063900 A1 | 6/2010 |

OTHER PUBLICATIONS

FR Search Report, dated May 4, 2017, from corresponding FR application No. 1656947.

* cited by examiner

*Primary Examiner* — Alison L Hindenlang
*Assistant Examiner* — Jennifer A Kessie

(57) ABSTRACT

Disclosed is a molding unit for the forming of a container provided with a hollow recess, this molding unit including: a mold provided with a lateral wall defining a cavity and provided with a pocket that comes out into the cavity; and a boxing device. The boxing device includes: an insert mounted in translation relative to the lateral wall between a retracted position in which the insert is retracted into the pocket, and a deployed position in which the insert projects into the cavity outside of the pocket; an actuator integral with the insert and provided with a piston; and an added sleeve, mounted in a complementary recess made in the lateral wall and attached to it, and in which the piston is mounted in translation.

20 Claims, 12 Drawing Sheets

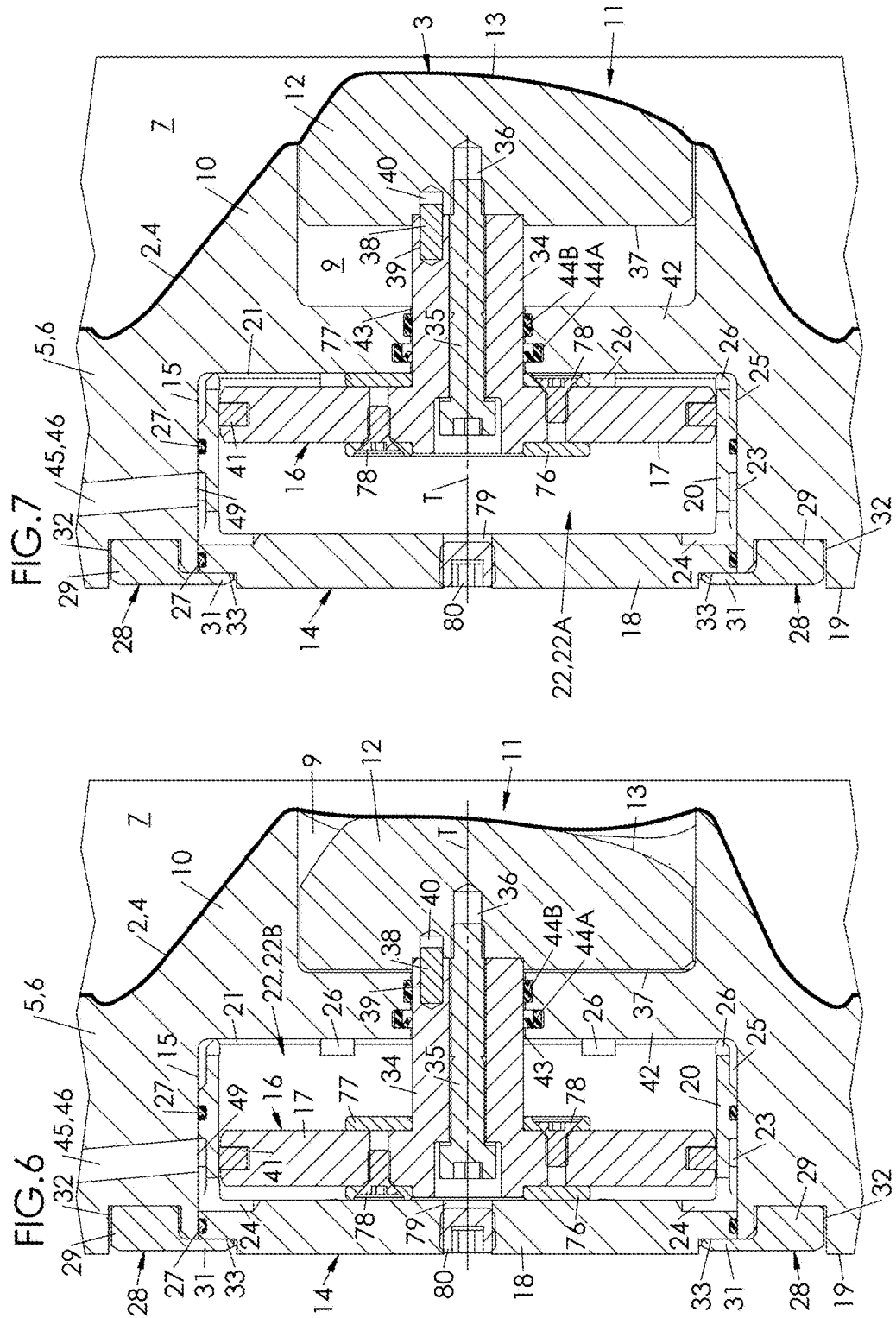

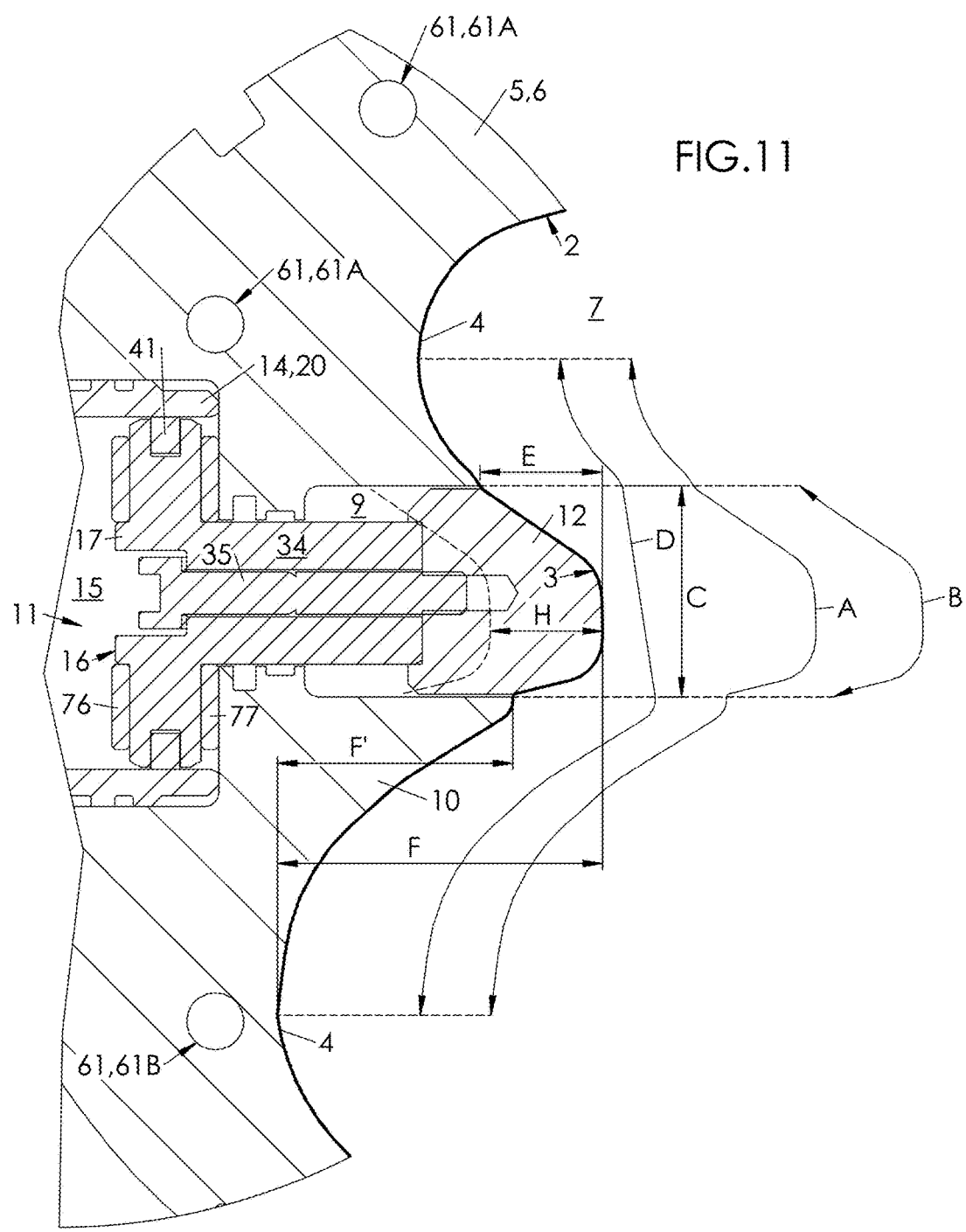

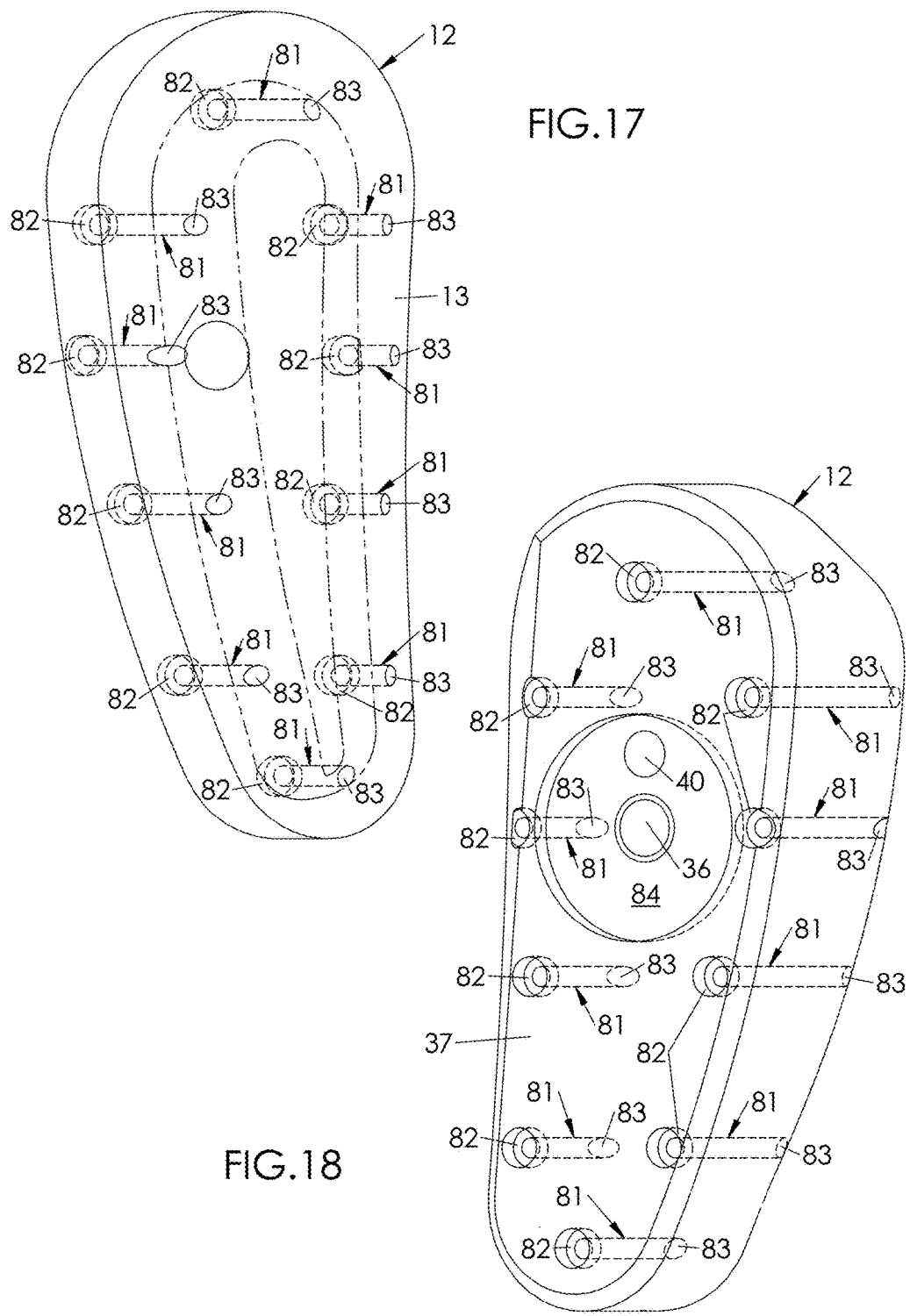

MOLDING UNIT FOR CONTAINERS, EQUIPPED WITH A BOXING DEVICE HAVING AN ADDED SLEEVE

This invention relates to the forming of containers, particularly bottles, jars, as well as canisters, from blanks of thermoplastic material (such as polyethylene terephthalate or PET), and more specifically to the forming of containers provided with hollow recesses such as incorporated handles.

Let us recall that the manufacture of containers generally comprises a blow-molding operation that takes place in a mold whose wall defines a cavity within which the blank is introduced, the latter, during blow molding, conforming to the wall under the effect of the high gas pressure that prevails in the blank, previously heated so as to enable its plastic deformation.

Some containers can be provided with hollow recesses toward the interior of the container and made with an esthetic purpose (for example, creating curves) or with a functional purpose (making a handle for grasping the container).

To achieve this, a molding unit is generally used that is provided with a movable insert that is initially retracted in the wall of the mold and that is deployed in the presence of the container being formed in the mold to push the material back when it reaches the wall, as illustrated in the international application WO 2010/063900 (Sidel Participations).

The technique described in this document, intended for a linear-type mold (which comprises two half-molds mounted in translation relative to one another), is not easily transferable to molds of the wallet type (in which the half-molds are mounted in rotation relative to one another), because of the considerable bulk, particularly radial, of the boxing device controlling the movement of the insert.

Furthermore, the insert is mounted at the end of a pair of relatively long rods. The resisting forces to which the insert is subjected not necessarily being parallel to the axes of the rods, the transverse resultants of these forces subject the rods to bending forces that generate mechanical fatigue and that also are able to jeopardize the fluidtightness of the guiding.

A first objective is to propose a molding unit for containers provided with a hollow recess, having at least one of the following qualities:
  increased reliability,
  improved compactness,
  enhanced efficiency.

For this purpose, a molding unit is proposed for the forming of a container provided with a hollow recess toward the interior of the container, this molding unit comprising:
  a mold provided with a lateral wall defining a cavity having the impression, at least partial, of the container, this lateral wall being provided with a pocket that comes out into the cavity;
  a boxing device comprising:
    an insert mounted in translation relative to the lateral wall along a transverse axis between a retracted position in which the insert is at least partially retracted into the pocket, and a deployed position in which the insert projects at least partially into the cavity outside of the pocket,
    an actuator integral with the insert and provided with a piston;
  the molding unit being characterized in that the boxing device comprises:
    an added sleeve, mounted in a complementary recess made in the lateral wall and attached to it, and in which the piston is mounted in translation, the sleeve defining a chamber subdivided by the piston into a rear half-chamber and a front half-chamber, the recess, the sleeve and the piston being rotationally asymmetric around the transverse axis,
    a fluid circuit for controlling the movement of the piston, which includes at least one primary duct for supplying the rear half-chamber, which communicates with it by several openings in the sleeve, which are distributed on its periphery.

The added sleeve serves as a wear part; it prevents the wall of the mold itself from wear under the effect of the friction from the piston. The result is, in particular, an enhanced reliability of the mold. In addition, the rotationally asymmetric shape prevents the undesired rotation of the insert and increases the precision of its guiding, improving the quality of the produced container. Furthermore, the distribution, preferably uniform, of the openings for communication of the rear half-chamber with the primary duct promotes a proper balance of the pressures in it, which also improves the precision of the guiding of the insert.

Various additional characteristics can be envisaged, alone or in combination:
  the recess, the sleeve and the piston are taller than they are wide;
  the recess, the sleeve and the piston have an oval profile with an approximately vertical major axis;
  the sleeve comprises at least two diametrically opposite openings along a vertical axis;
  the sleeve comprises four openings distributed at 90° around the transverse axis;
  the sleeve comprises a back wall and a cylinder that projects from the back wall and ends by an edge, the back wall and the cylinder defining the chamber on the inside;
  the sleeve is provided, on an outer peripheral surface of the cylinder, with a rear groove that opens into the chamber by the openings, and the primary fluid duct is made in the wall of the mold and opens into the recess in line with the rear groove;
  the fluid circuit for controlling the movement of the piston includes a secondary duct for supplying the front half-chamber, which communicates with it by notches made in the edge;
  the sleeve is provided, on an outer peripheral surface of the cylinder, with a front groove that opens into the chamber by the notches, and the secondary fluid duct is drilled into the wall of the mold and opens into the recess in line with the front groove;
  the recess is separated from the pocket by a partition drilled with a hole, and the actuator is provided with a rod mounted in translation in this hole and onto which the insert is fastened;
  the insert is fastened onto the rod by screwing;
  the insert is fastened onto the rod by means of a screw going through the piston and the rod and helically engaging with a threaded hole made in a rear surface of the insert;
  the insert is locked in rotation relative to the actuator by means of a pin;
  the or each fluid duct comes out on an upper surface of the mold;
  the boxing device comprises a pair of added Silentblocs, fastened onto the actuator on both sides of the piston (it is recalled that the term "Silentbloc" (in the singular) is a French trademark of the company HUTCHINSON SA, from which a common name was originated that is used to designate (see the Larousse Dictionary [dictionnaire Larousse], for example) a flexible mounting device or a device for shock absorption between two elements: the use of the terms "Silentbloc" or "Silentblocs" in this application refers to such a device);

the Silentblocs are made of polyurethane;

the sleeve is fastened onto the lateral wall of the mold at least by means of a bracket, comprising a body attached to the mold by screwing, and by means of a tongue projecting from the body and resting against an outer surface of the sleeve;

the sleeve is made of steel;

the actuator is made of aluminum;

the molding unit is equipped with a pair of symmetric boxing devices whose inserts are placed opposite one another.

Other objects and advantages of the invention will be brought out in the description of an embodiment, made below with reference to the accompanying drawings in which:

FIG. 6 is a vertical detail cutaway view showing a boxing device in retracted position of the insert, during the forming of a container;

FIG. 7 is a view similar to FIG. 6, showing the insert in deployed position;

FIG. 11 is a horizontal detail cutaway view illustrating the scaling of the mold and the insert;

FIG. 17 is a view in perspective, from the front, of an insert that equips the half-mold of FIG. 15 and FIG. 16;

FIG. 18 is a view in perspective, from the back, of the insert of FIG. 17.

Figure 1:
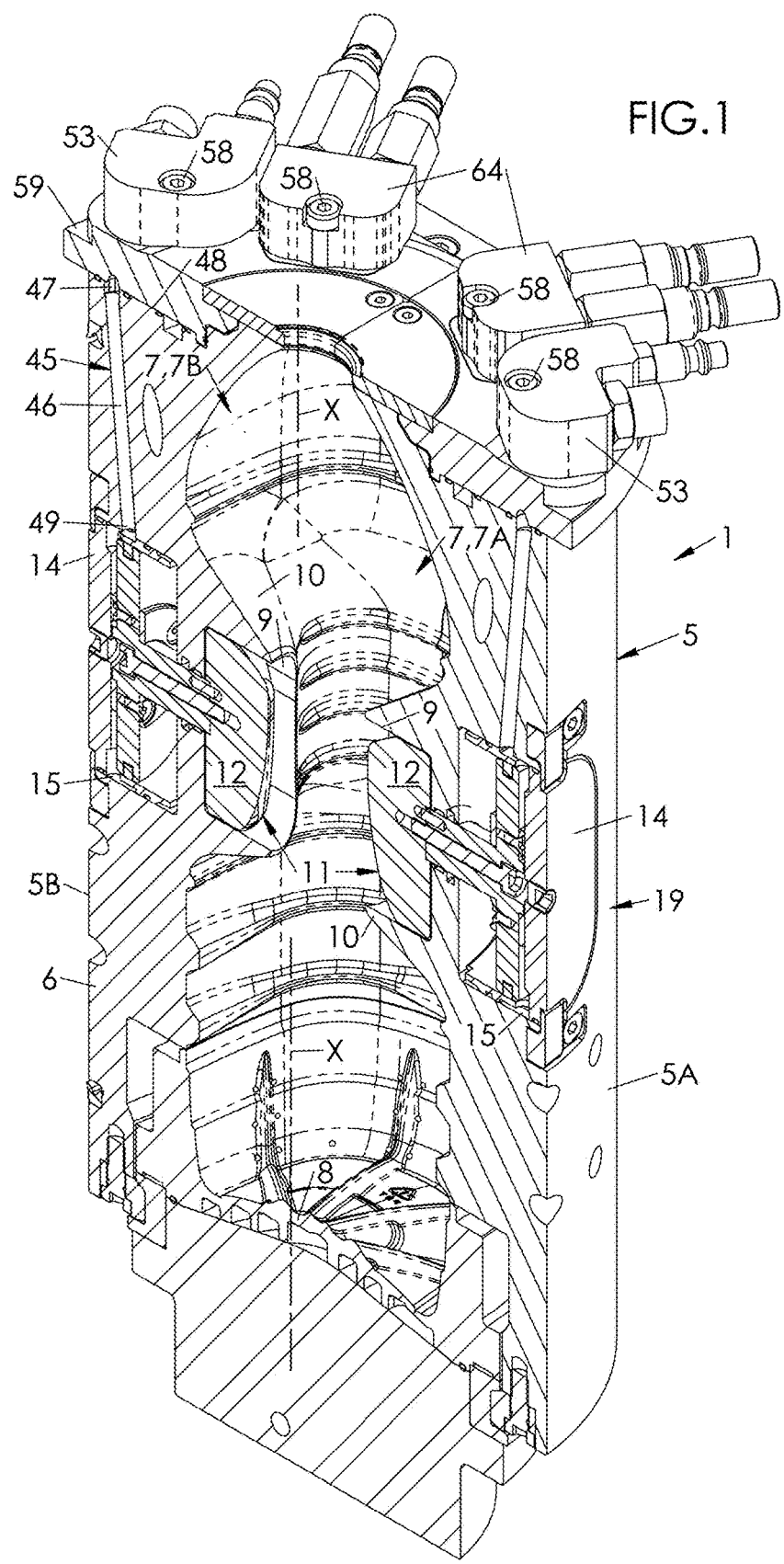
FIG. 1 is a cutaway view in perspective showing a molding unit provided with a pair of boxing devices.
Figure 13:
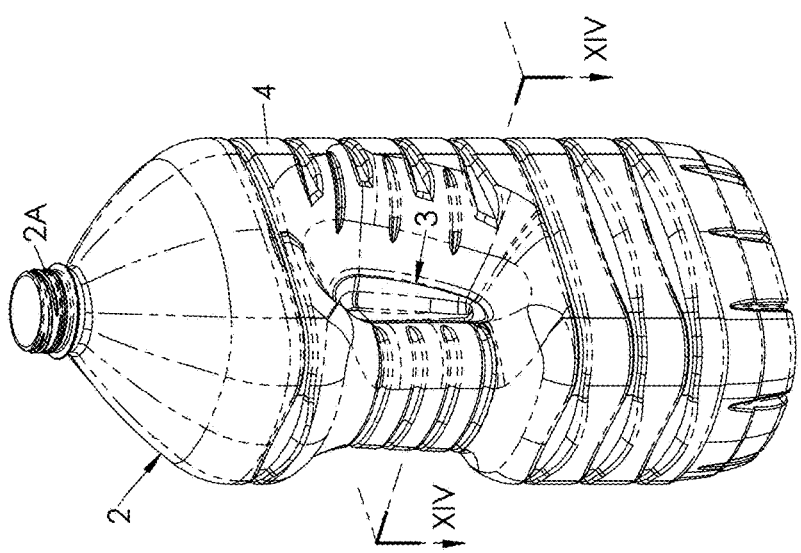
FIG. 13 is a view in perspective of a container formed in a molding unit as illustrated in the preceding figures.

In FIG. 1, shown in section and in perspective, there is a molding unit 1 for forming, from a blank (typically a preform), a container 2 (such as a bottle or a canister, as illustrated in FIG. 13) provided with a hollow recess 3 formed toward the interior of the container 2. The container 2 is provided, in a standard way, with a body 4, a bottom and a neck 2A that opens opposite the bottom. In the example illustrated in FIG. 13 and FIG. 14, the hollow recess 3 is a handle formed in the body 4 of the container to make it easy to grasp.

Figure 14:
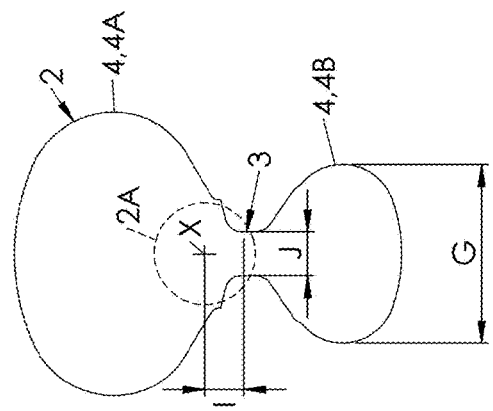
FIG. 14 is a horizontal cutaway view of the container of FIG. 13, along the cutting plane XIV-XIV.

In this case, the body 4 is, in the area of the handle, subdivided into a front part 4A and a back part 4B. As illustrated in FIG. 14, the front part 4A and the part 4B have rounded shapes. The back part 4B is the part that is intended to be held in the user's palm when the user grabs the container individually.

The molding unit 1 comprises, firstly, a mold 5 provided with a lateral wall 6 that defines a cavity 7 having the impression of a portion of the container 2. In this particular case, the cavity 7 has the impression of the body 4 of the container 2, the mold 5 further comprising a bottom 8 having the impression of the bottom of the container 2. The mold 5 is made of metal, for example steel or aluminum (this term also covering the alloys of aluminum). The cavity 7 (and therefore the container 2) extends along a main axis X that defines a vertical direction. Any plane perpendicular to the main axis X is called horizontal.

According to an embodiment illustrated in the drawings, the lateral wall 6 comprises two half-molds 5A, 5B each defining a half-impression 7A, 7B of the body 4 of the container 2 and that are mounted in rotation relative to one another around a common axis formed by a hinge, between:

an open position, in which the half-molds 5A, 5B are angularly separated from one another to make possible the insertion of the blank and the removal of the formed container 2, a closed position (illustrated in FIG. 1 and in FIG. 5), in which the half-molds 5A, 5B are applied against one another and enclose between them the bottom 8 of the mold, thus to form the cavity 7 and define the impression of the container 2 to be formed.

The lateral wall 6 is provided with a pocket 9 that opens into the cavity 7. As is seen particularly in FIG. 6 and in FIG. 7, this pocket 9 is made hollow in a protrusion 10 that forms a projection toward the interior of the cavity 7 and that forms a portion of the counter-impression of the hollow recess 3 that defines the handle.

Figure 5:
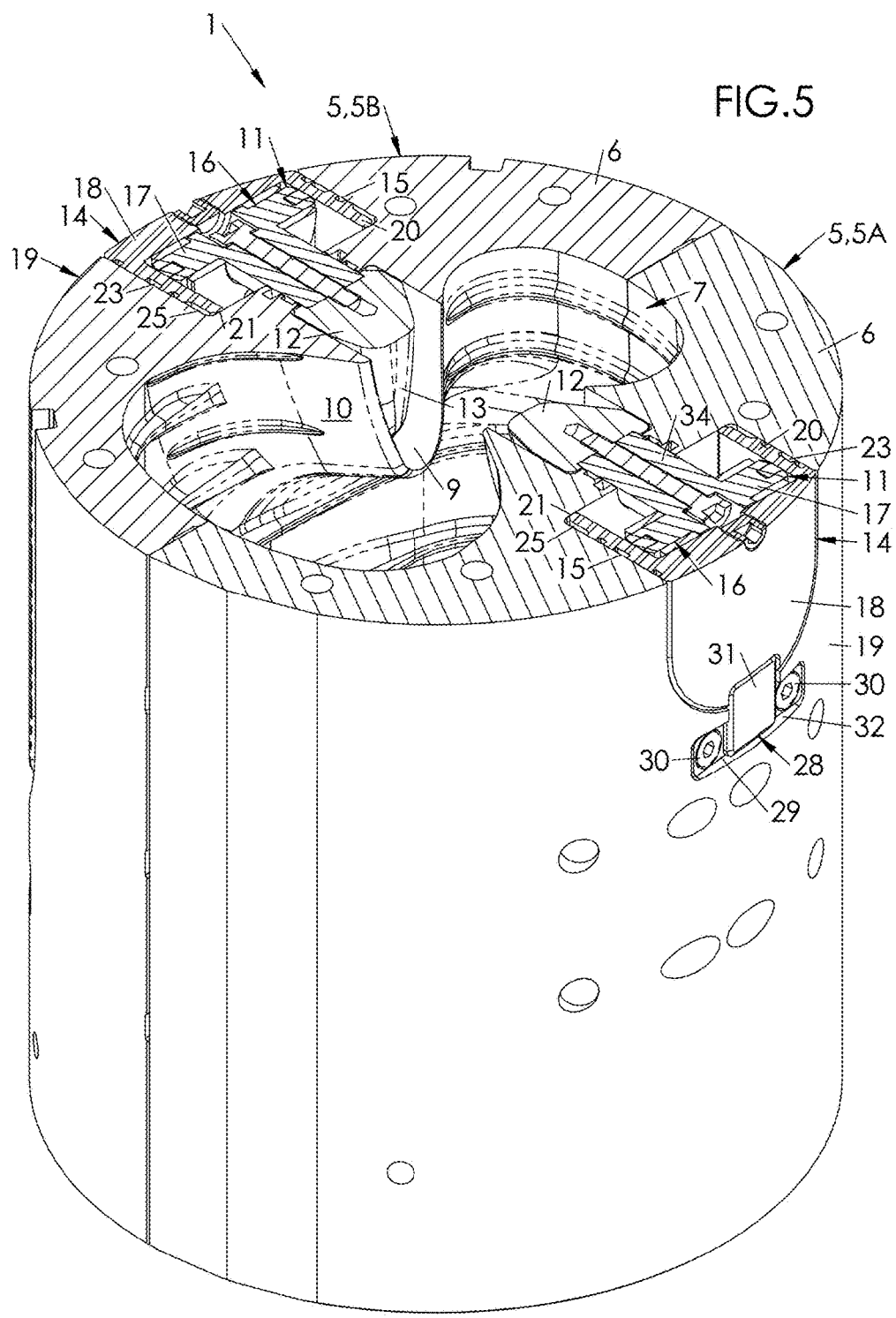
FIG. 5 is a horizontal cutaway view showing the molding unit, taken in the area of the boxing devices.

According to an embodiment illustrated particularly in FIG. 1 and in FIG. 5, corresponding to a container 2 provided with two hollow recesses 3, preferably symmetric in relation to a general central plane of symmetry of the container 2 and together forming the handle, each half-mold 5A, 5B is provided with a pocket 9 that opens into the half-impression 7A, 7B and is made hollow in a protrusion 10 that forms a projection toward the interior of the cavity 7.

The molding unit 1 comprises secondly, and for each pocket 9, a boxing device 11. The term "boxing" designates a technique for local shaping of the material by pushing back by means of a movable part, carried out during the forming of the container 2 (and more specifically initiated during the pre-blow-molding and blow-molding phases of the container 2).

Each boxing device 11 comprises an insert 12, with a complementary shape of a pocket 9 and accommodated in it. Each insert 12 has a front surface 13 having the impression of a local portion (i.e., of relative small surface area) of the container 2, and more specifically of the bottom of the hollow recess 3. The front surface 13 is intended to push back the material of the container 2 to complete the impression of the hollow recess 3, as will be explained below. The insert 12 is advantageously made of aluminum.

As is seen in FIG. 1 and in FIG. 5, the molding unit 1 is equipped with a pair of boxing devices 11 (preferably symmetric) whose inserts 12 are placed opposite one another.

Each insert 12 is mounted in translation relative to the lateral wall 6 (i.e., in the example illustrated, relative to each half-mold 5A, 5B) along a transverse axis T between a retracted position (FIG. 6 and FIG. 8) in which the insert 12 is at least partially retracted into the pocket 9, and a deployed position (FIG. 7 and FIG. 9) in which the insert 12 projects at least partially into the cavity 7 outside of the pocket 9.

Figure 8:
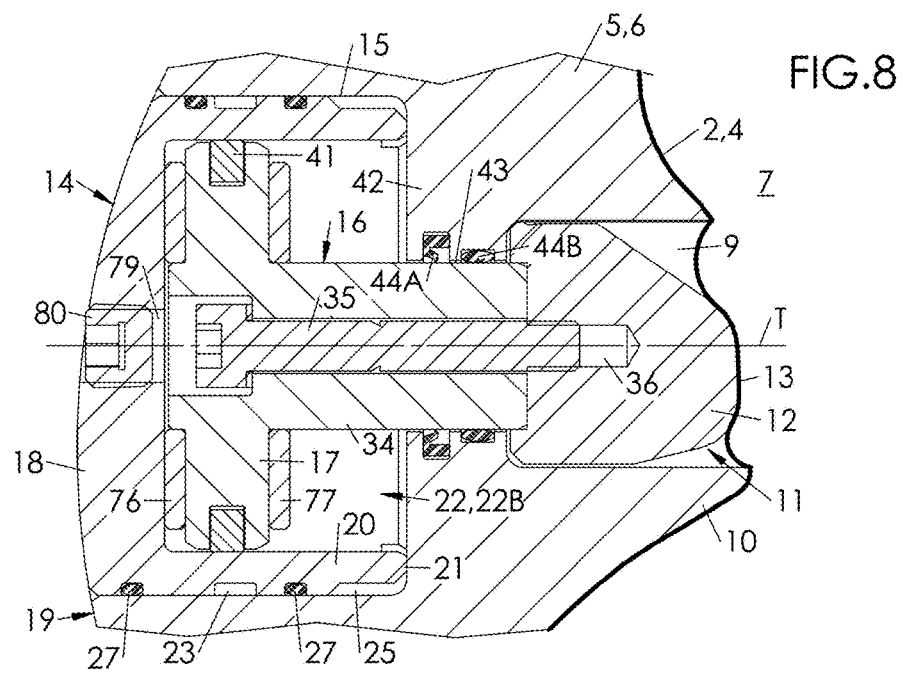
FIG. 8 is a horizontal detail cutaway view showing the boxing device in retracted position of the insert, during the forming of a container.

More specifically, and as is clearly visible in FIG. 6 and in FIG. 8, in retracted position of the insert 12, the front surface 13 is included in the pocket 9 and does not go beyond the protrusion 10, whereas in deployed position of the insert 12, the front surface 13 projects into the cavity 7 and extends into the extension of the protrusion 10 to complete with it the impression of the recess 3 formed hollow in the container 2.

This configuration is not exclusive. Thus, according to another embodiment, in retracted position of the insert 12, the front surface 13 of the insert 12 is situated projecting in relation to the internal edge of the protrusion 10. According to still another embodiment, in retracted position of the insert 12, the front surface 13 of the insert 12 is found in the extension of the internal edge of the protrusion 10.

Figure 2:
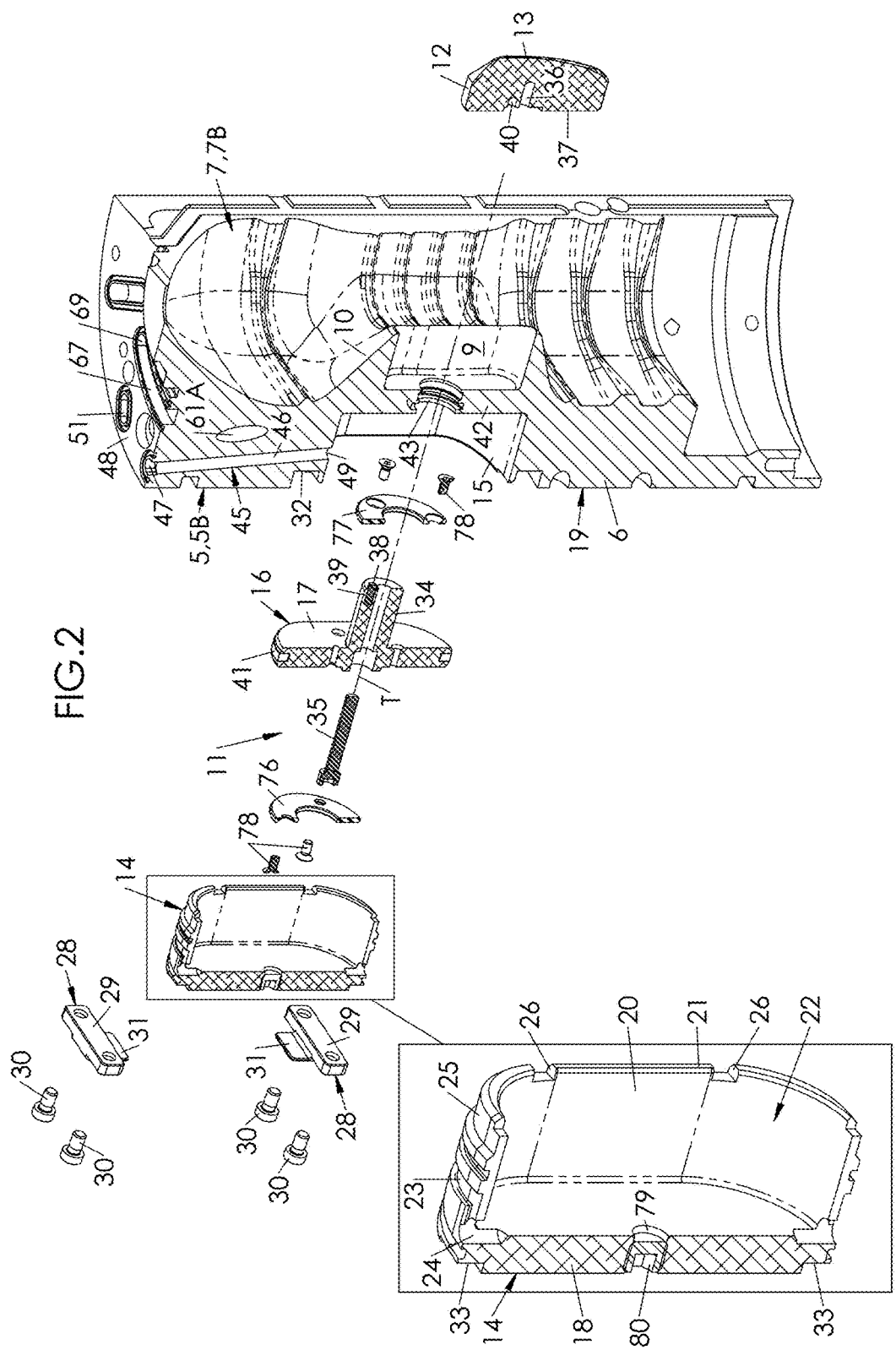
FIG. 2 is an exploded cutaway view in perspective showing, from the inside, a half-mold and its associated boxing device.
Figure 3:
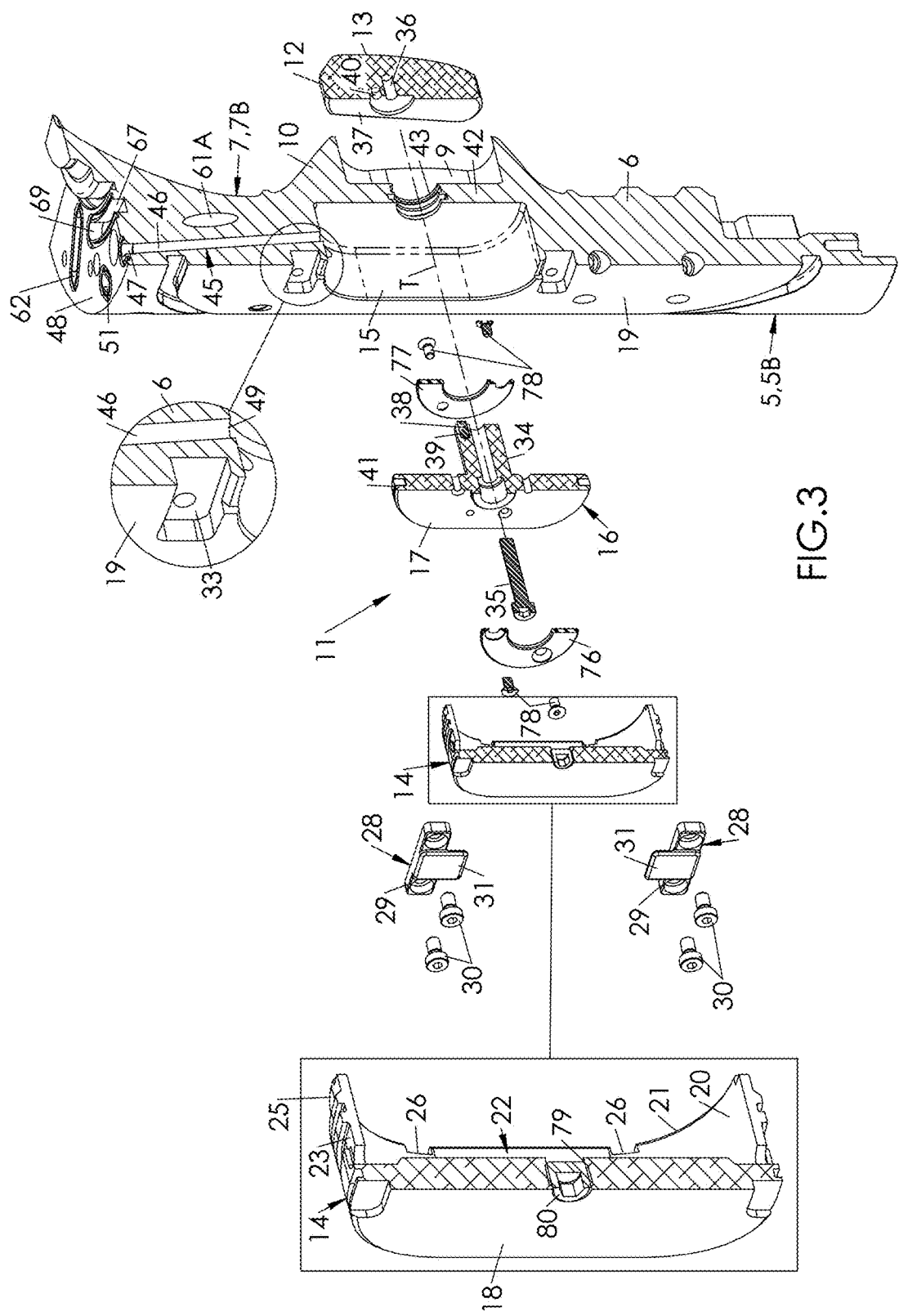
FIG. 3 is an exploded cutaway view in perspective showing, from the outside, a half-mold and its associated boxing device.

As is seen clearly in FIG. 2 and FIG. 3, the insert 12 (like its pocket 9) has an asymmetric rotational profile around the axis T, which blocks the rotation of the insert 12 around it. More specifically, the insert 12, preferably, has a height (along the general axis X of the mold 5) that is greater than the width (in a horizontal plane). In the example illustrated, the insert 12 has an oval profile with a long, approximately vertical axis.

As illustrated in the drawings, each boxing device 11 further comprises an added sleeve 14, mounted in a hollowed-out complementary recess 15 in the lateral wall 6 (i.e., in the example illustrated, in each half-mold 5A, 5B) and attached to it. The sleeve 14 is advantageously made of steel.

Each boxing device 11 further comprises an actuator 16 that is integral with the insert 12 to move it from its retracted position to its deployed position, and vice-versa, and comprising for this purpose a piston 17 mounted in translation in the sleeve 14. The actuator 16 is preferably made of aluminum.

According to an embodiment illustrated in the drawings, and more particularly visible in FIG. 6 to FIG. 9, the sleeve 14 comprises a back wall 18 that, when the sleeve 14 is inserted into its recess 15, is flush with an outer surface 19 of the mold 5, and a cylinder 20 that projects transversely from the back wall 18 and ends by an edge 21.

The sleeve 14 defines on the inside a chamber 22 in which the piston 17 is mounted. Like the insert 12, the sleeve 14 and the recess 15 accommodating it, just like the piston 17, have an asymmetric rotational profile around the transverse axis T, which blocks any rotation of the piston 17 around it, promoting the precision of guiding in translation of the insert 12. More specifically, the sleeve 14, its recess 15 and the piston 17, preferably, have a height (along the general axis X of the mold 5) that is greater than their width (in a horizontal plane). In the example illustrated, the sleeve 14, the recess 15 and the piston 17 have an oval profile with a long, approximately vertical axis.

The piston 17 subdivides the chamber 22 into a rear half-chamber 22A and a front half-chamber 22B. In the example illustrated, the rear half-chamber 22A is restricted on the inside by the piston 17 and on the outside by the back wall 18 of the sleeve 14. Also in the example illustrated, the front half-chamber 22B is restricted on the outside by the piston 17 and on the inside by the bottom of the recess 15.

The sleeve 14 is provided, on an external peripheral surface of the cylinder 20, with a rear groove 23 that opens into the rear half-chamber 22A by several openings (here in the form of through holes) 24 in the sleeve 14, arranged on its periphery. In the example illustrated, the sleeve 14 is provided with two diametrically opposed openings 24, arranged in this particular case along a vertical axis. As a variant, the sleeve 14 could include a higher number of openings 24, for example four openings 24 arranged at 90° (or otherwise) around the transverse axis T.

The sleeve 14 is further provided, on the external peripheral surface of the cylinder 20, with a front groove 25 that opens into the front half-chamber 22B by several notches 26 made in the edge 21 and arranged on the periphery of the sleeve 14. In the example illustrated, the sleeve 14 is provided with six notches arranged at about 60° around the transverse axis T.

Rings 27 mounted on the external surface of the cylinder 20, and compressed between it and the recess 15, ensure the fluidtightness of the grooves 23, 25 in relation to one another, and therefore of the half-chambers 22A, 22B in relation to one another.

After its introduction into the recess 15, the sleeve 14 is attached to the lateral wall 6 of the mold 5. As can be seen in the drawings, and more particularly in FIG. 2 and FIG. 3, the sleeve 14 is attached to the lateral wall 6 by means of at least one bracket 28 comprising a body 29 attached to the mold 5 by means of screws 30, and a tongue 31 projecting from the body 29 and resting, on the outside, against the back wall 18 of the sleeve 14. In the example illustrated, the sleeve 14 is attached to the lateral wall 6 by means of a pair of brackets 28 mounted vertically on both sides of the sleeve 14.

To avoid any protrusion on the outer surface 19 of the mold 5, each bracket 28 advantageously is housed in a hollow recess 32 made in a complementary way in the lateral wall 6 of the mold 5, while the tongue 31 is housed in a recess 33 made in the back wall 18 of the sleeve 14.

According to an embodiment illustrated in the drawings, the actuator 16 comprises a rod 34 that extends radially projecting from the piston, and onto which the insert 12 is fastened, for example by screwing.

More specifically, in the example illustrated, the insert 12 is fastened onto the rod 34 by means of a screw 35 that goes through the piston 17 and the rod 34 and that engages helically with a threaded hole 36 made in a rear surface 37 of the insert 12, opposite the front surface 13.

The insert 12 is advantageously locked in rotation relative to the actuator 16 by means of a pin 38 mounted in a hole 39 made in the rod 34 and one projecting end of which is housed in a hole 40 made, opposite, in the rear surface 37 of the insert 12.

As can clearly be seen in FIG. 6 to FIG. 9, the piston 17 is provided with an added peripheral segment 41, in contact with the cylinder 20 and that, in addition to the rings 27, ensures the fluidtight partitioning of the two half-chambers 22A, 22B. The segment 41 is advantageously made of a material having a low coefficient of friction, for example of bronze or, preferably, of polytetrafluoroethylene (PTFE).

As is seen also in FIG. 6 to FIG. 9, the recess 15 ends, on the side of the cavity 7, by a partition 42 that separates the recess 15 from the pocket 9 and delimits the front half-chamber 22B on the inside.

This partition 42 is pierced with a hole 43 in which the rod 34 of the actuator 16 is mounted in translation, with the interposition of one or more sealing rings 44A that isolate the front half-chamber 22B from the pocket 9, and preferably also with interposition of one or more guide rings 44B. In the example illustrated, the ring 44A is a dynamic lip ring. As for the ring 44B, it can be made of PTFE (polytetrafluoroethylene).

Each boxing device 11 comprises a fluid circuit 45 for controlling the movement of the piston 17, at least from its retracted position to its deployed position. According to an advantageous embodiment, the fluid circuit 45 is pneumatic, the fluid used being a gas (typically air) under pressure.

Each circuit 45, for this purpose, comprises at least one primary fluid duct 46 for supplying the chamber 22 (and more specifically the rear half-chamber 22A) that communicates with the chamber 22 (and more specifically with the rear half-chamber 22A) by the openings 24.

In practice, and as can be seen particularly in FIG. 1 to FIG. 3, FIG. 6, FIG. 7 and FIG. 10, the primary duct 46 is drilled in the mold 5 and opens, by an upstream end 47, onto an upper surface 48 of the mold 5 and, by a downstream end 49, into the recess 15 in line with the rear groove 23 (FIG. 6 and FIG. 7).

According to an embodiment illustrated in the drawings, controlling the movement of the piston 17 is of the dual action type, each fluid circuit 45 being configured to control, furthermore, the movement of the corresponding piston 17 from its deployed position to its retracted position.

For this purpose, each circuit 45 comprises a secondary fluid duct 50 for supplying the front half-chamber 22B, which communicates with it by the notches 26.

Figure 4:
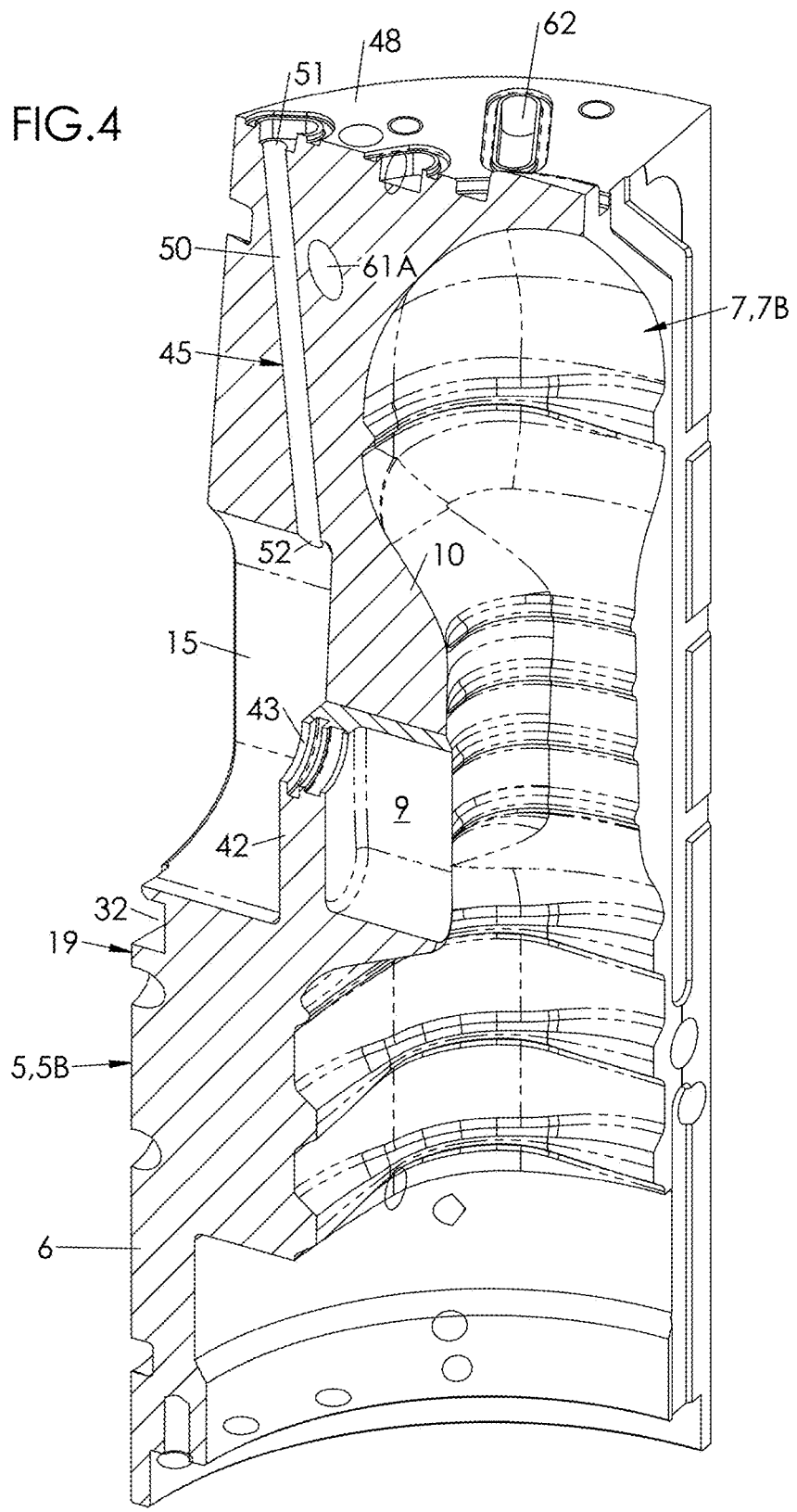
FIG. 4 is a view in perspective and in broken section showing the half-mold of FIG. 2 and FIG. 3.

More specifically, and as can be seen particularly in FIG. 4, the secondary duct 50 is drilled in the mold 5 and opens, by an upstream end 51, on the upper surface 48 of the mold 5 and, by a downstream end 52, into the recess 15 in line with the front groove 25.

Figure 10:
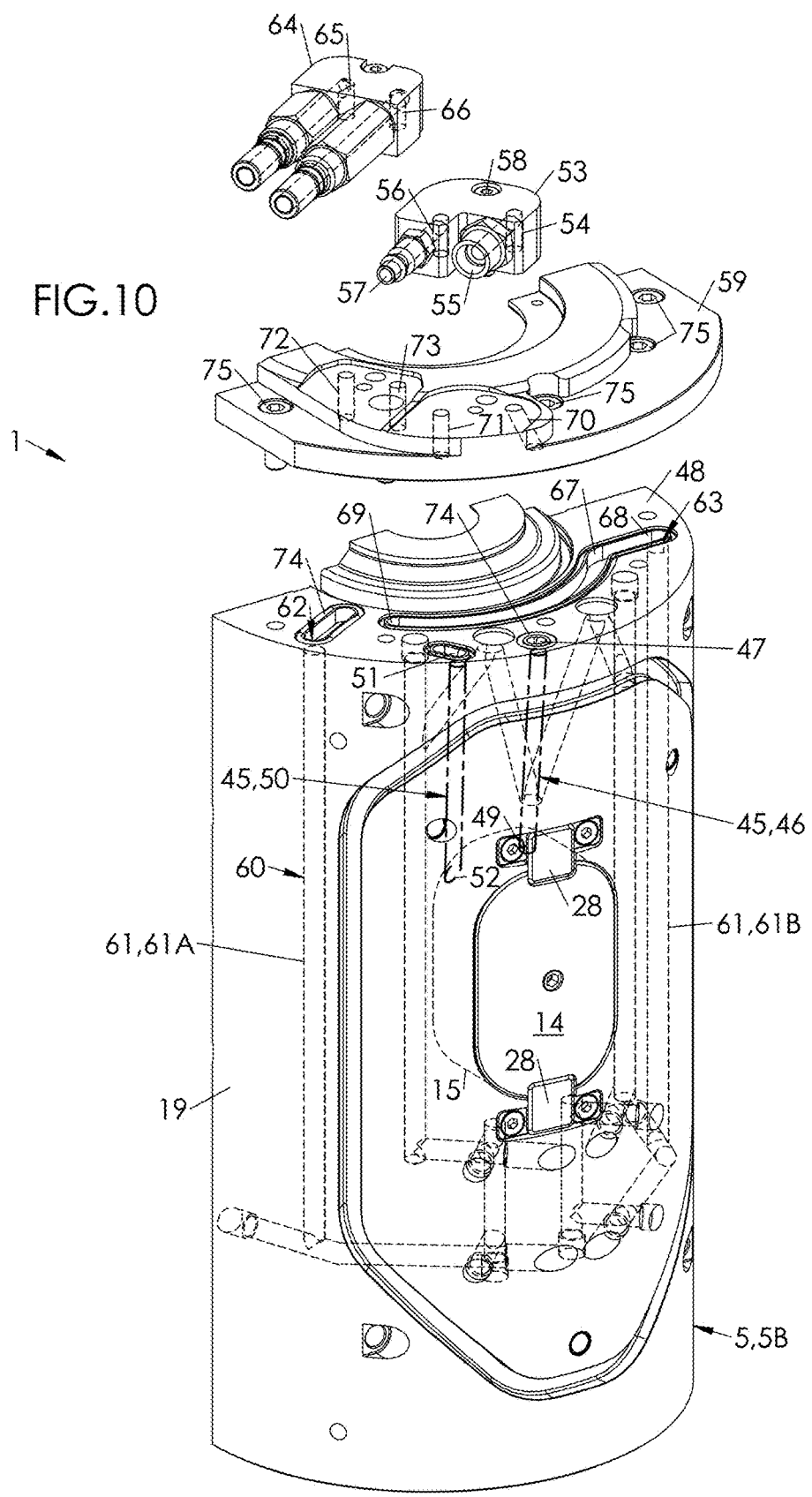
FIG. 10 is an exploded view in perspective showing a portion of the molding unit.

According to an embodiment illustrated in the drawings, the primary duct 46 is made approximately vertically in the lateral wall 6 of the mold 5, whereas the secondary duct 50 is made obliquely (however, with a rather small angle) in the lateral wall 6 of the mold 5. In FIG. 10, the primary duct 46 and the secondary duct 50 are represented in bold broken lines.

As is seen in FIG. 1 and FIG. 10, the molding unit 1 comprises a pneumatic connector 53 for supplying pressurized fluid at least from the primary duct 46. For this purpose, the connector 53 comprises a primary inlet 54 in communication with the upstream end 47 of the primary duct 46. This primary inlet 54 advantageously appears in the form of a duct drilled in the connector 53, and which opens into a primary plug 55 (here of the male type) for connecting to a primary tube (not shown) for supplying pressurized fluid.

The primary inlet 54 is, via the primary plug 55 and the primary tube, preferably connected to a fluid source, typically gas, at high pressure, advantageously greater than 20 bars (and, for example, about 40 bars). It can be the source used for the blow molding of the containers or else another pressure source, generating, if necessary, a pressure with a value that is different from the blow-molding source.

In the example illustrated, where controlling the movement of the piston 17 is dual action, and where, apart from the primary duct 46, the pneumatic circuit 45 comprises a secondary passage 50 for supplying the front half-chamber 22B, the pneumatic connector 53 comprises a secondary inlet 56 in communication with the upstream end 51 of the secondary duct 50. This secondary inlet 56 advantageously appears in the form of a duct drilled in the connector 53, and which opens into a secondary plug 57 (here also of the male type) for connecting to a secondary tube (not shown) for supplying pressurized fluid.

The secondary inlet 56 is, via the secondary plug 57 and the secondary tube, connected to a fluid source having comparatively lower pressure, advantageously less than or equal to 12 bars (and, for example, about 7 bars).

The upstream ends 47, 51 of the ducts 46, 50 advantageously come out near one another, so as to enable their common connection to the respective sources of pressurized fluid via a single connector 53 mounted on the upper surface 48 of the mold 5, as illustrated in FIG. 1.

The connector 53 is attached to the mold 5 by snapping-on or, as in the example illustrated in FIG. 1 and in FIG. 10, by means of at least one screw 58.

According to an advantageous embodiment illustrated in FIG. 1 and in FIG. 10, the molding unit 1 comprises a cover 59 mounted on the upper surface 48 of the mold 5 and interposed between it and the connector 53.

As can be seen in FIG. 10, the molding unit 1 comprises a fluid circuit 60 (for example, hydraulic) for thermal regulation of the wall 6. The fluid used is advantageously a liquid, for example water or oil. This circuit 60 is provided to maintain the temperature of the wall 6 at an approximately constant temperature, either low (typically on the order of 10° C.) to ensure a cooling of the container 2 only just formed, or high (typically on the order of 120° C.) to ensure a heat-setting of the container 2 and thus to enhance, by thermal means, its crystallinity (and therefore its mechanical strength).

As is seen in FIG. 10, the fluid circuit 60 includes passages 61 drilled in the wall 6 of the mold 5 and extends between a supply opening 62 and an evacuation opening 63 made in the upper surface 48 of the mold 5. In other words, the fluid circuit 60 comes out, by the supply opening 62 and by the evacuation opening 63, on the upper surface 48 of the mold 5.

For reasons of ease of production (by drilling), the passages 61 are subdivided into several sections, most notably:
  an upstream section 61A, which comes out on the supply opening 62 and includes several holes made vertically, horizontally and/or obliquely in the wall 6;
  a downstream section 61B, which comes out on the evacuation opening 63 and also includes several holes made vertically, horizontally and/or obliquely in the wall 6 and which communicates with the upstream section 61A in a middle zone of the mold 5.

As can be seen in FIG. 10 where they are visible transparently in dashed lines, the passages 61 are drilled so as to go around the recess 15 and so as not to intersect the ducts 46, 50 of the pneumatic fluid circuit 45.

As is seen in FIG. 1 and in FIG. 10, the molding unit 1 comprises a fluid connector 64 mounted on the upper surface 48 of the mold 5 to ensure the supply to the fluid circuit 60 of fresh (or, respectively, reheated) liquid and to ensure the evacuation from it of the reheated (or cooled) liquid, after it has performed a heat exchange with the wall 6.

For this purpose, the fluid connector 64 comprises a fluid inlet 65 (here in the form of a duct drilled in the connector 64) in communication with the supply opening 62, and a fluid outlet 66 (here also in the form of a duct drilled in the connector 64) in communication with the evacuation opening 63.

In the example illustrated in FIG. 10, the openings 62, 63 are at a distance from one another, and come out on the upper surface 48 in an approximately diametrically opposite way. To make possible a simultaneous fluid connection of the openings 62, 63 via a compact connector 64, the mold 5 comprises a groove 67 that is made in the upper surface 48, which extends from an outer end 68 located in line with the evacuation opening 63 to an inner end 69 located in the vicinity of the supply opening 62.

According to a preferred embodiment, illustrated in FIG. 1 and in FIG. 10, where the molding unit 1 is provided with an added cover 59 attached to the upper surface 48 of the mold 5, this cover 59 is interposed between the upper surface 48 and the fluid connector 64.

As can be seen by transparency in FIG. 10, the cover 59 is provided with through holes 70 to 73 for putting each connector 53, 64 in communication with its respective circuit 45, 60.

In a more detailed manner, the cover 59 comprises:
a first through hole 70 (oblique) for putting the primary inlet 54 of the pneumatic connector 53 in communication with the upstream end 47 of the primary duct 46;
a second through hole 71 (vertical) for putting the secondary inlet 56 of the pneumatic connector 53 in communication with the upstream end 51 of the secondary duct 50;
a third through hole 72 (vertical) for putting the fluid inlet 65 in communication with the supply opening 62;
a fourth through hole 73 (vertical) for putting the fluid outlet 66 in communication with the evacuation opening 63. In the example illustrated, the fourth through hole 73 opens in line with the inner end 69 of the groove 67, by which the fourth through hole 73 is in fluid communication with the evacuation opening 63.

The gas and liquid (typically air and water) fluidtightness of the interface between the cover 59 and the upper surface 48 is ensured, around the upstream ends 47, 51 of the ducts 46, 50 and around the openings 62, 63 (and more specifically around the groove 67), by means of elastomer rings 74, for example of silicone or of natural or synthetic rubber.

The attaching of the cover 59 onto the upper surface 48 of the mold 5 can be, in the example illustrated, ensured by means of screws 75.

The fact that the pneumatic circuit 45 and the fluid circuit 60 both come out on the upper surface 48 of the mold 5 makes it possible to offset on it the connections for supplying the circuits 45, 60, and thereby offers at least three advantages:
first, it is not necessary to accommodate lateral accesses to the intake (and evacuation) tubes, which simplifies the structure of the molding unit 1, and in particular parts supporting the mold 5;
then, the radial bulk of the molding unit 1 is reduced;
finally, the connections through the upper surface 48 are simpler and easier for any technician responsible for the maintenance of the molding unit 1.

Figure 9:
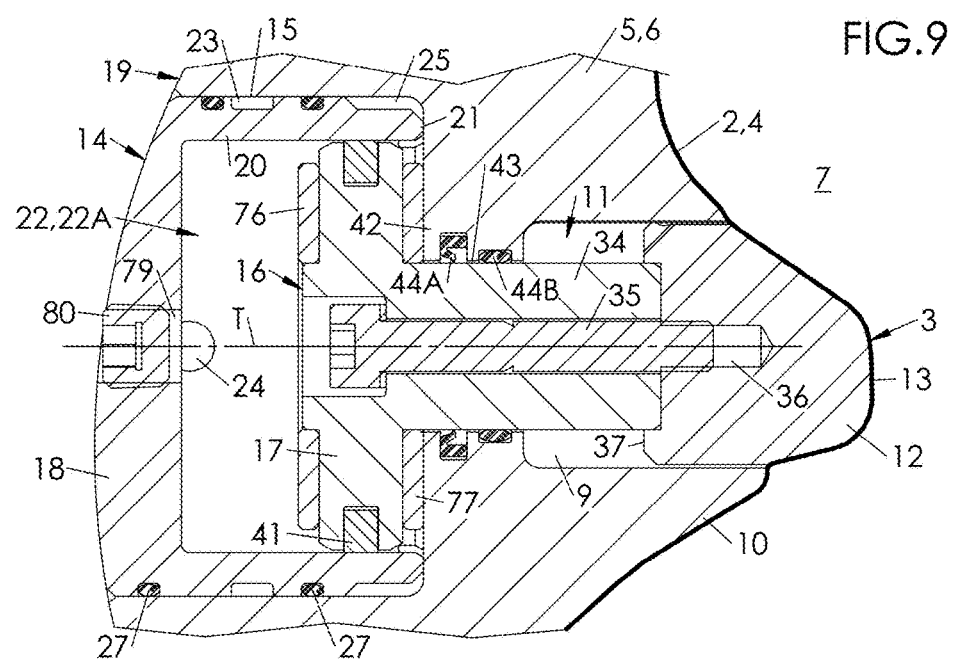
FIG. 9 is a view similar to FIG. 8, showing the insert in deployed position.

Furthermore, to ensure the precise positioning of the insert 12 relative to the cavity 7, and to limit in addition the wear of the actuator 16 and of the mold 5, each boxing device 11 advantageously comprises a pair of Silentblocs 76, 77, fastened onto the actuator 16 on both sides of the piston 17, namely:
a rear Silentbloc 76 fastened onto the piston 17 by means of screws 78, and which, in retracted position of the insert 12, is sandwiched between the piston 17 and the back wall 18 (FIG. 6, FIG. 8);
a front Silentbloc 77 press-fitted on the rod 34 and fastened onto the piston 17 by means of screws 78 and which, in deployed position of the insert 12, is sandwiched between the piston 17 and the partition 42 (FIG. 7, FIG. 9).

It should be noted here that the term "Silentbloc" (in the singular) is a French trademark of the company HUTCHINSON S.A., from which a common name was originated that is used to designate (see the Larousse Dictionary [dictionnaire Larousse], for example) a flexible mounting device or a device for shock absorbing between two elements: the use of the terms "silentbloc" or "silentblocs" in this application refers to such a device.

According to a preferred embodiment, each Silentbloc 76, 77 is made of polyurethane, preferably in a grade of polyurethane marketed by the Trelleborg Company under the name Zurcon Z20 (registered trademark). This material exhibits the dual advantage of an enhanced hardness (promoting the positioning precision of the insert 12) and of a good resistance to wear, which promotes the reliability and durability of the boxing device 11.

The mounting of each boxing device 11 in each half-mold 5A, 5B is illustrated in FIG. 2 and FIG. 3.

The Silentblocs 76, 77 are fastened onto the actuator 16 by means of screws 78; the pin 38 is press-fitted into the hole 39 and the screw 35 for fastening the insert 12 introduced into the actuator 16 to cause the end of the rod 34 to project. The piston 17 is then inserted into the sleeve 14, then the sleeve, equipped with its sealing rings 27, is introduced, from the outside of the mold 5, into its recess 15 along the transverse axis T, the rod 34 being inserted into the hole 43.

The sleeve 14 is attached to the lateral wall 6 of the mold by means of brackets 28, which are mounted in their respective recesses 32 and screwed onto the lateral wall 6. The insert 12 is mounted from the interior of the half-mold 5A, 5B while being introduced into the pocket 9 along the transverse axis T until contact is made with the end of the rod 34, the pin 38 being housed in the hole 40 made in the rear surface 37 of the insert 12.

The fastening of the insert 12 onto the rod 34 is then performed by means of the screw 35, whose tightening in the threaded hole 36 is ensured by means of a screwdriver or an appropriate wrench (depending on the impression formed in the screw head) that goes through an opening 79 made, along the axis T, in the back wall 18 of the sleeve 14.

Once the fastening of the insert 12 onto the actuator 16 is done, the opening 79 is closed in a fluidtight manner by means of a plug 80 press-fitted or screwed into it, as illustrated in FIG. 6 to FIG. 9.

Figure 12:
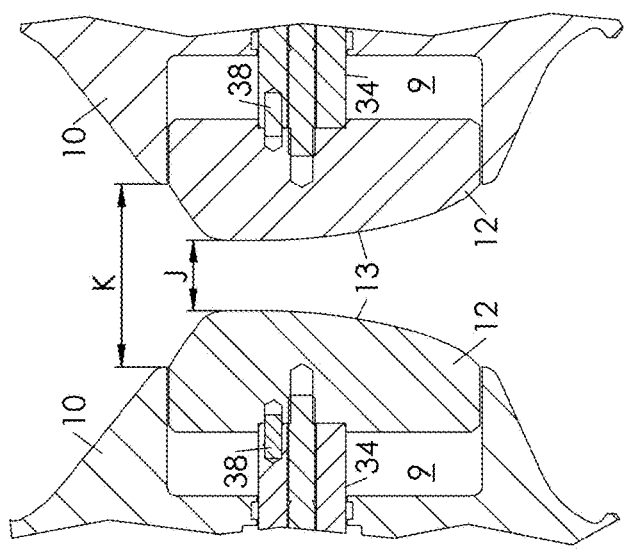
FIG. 12 is a vertical partial cutaway view of the mold, showing the two facing inserts in deployed position.
Figure 15:
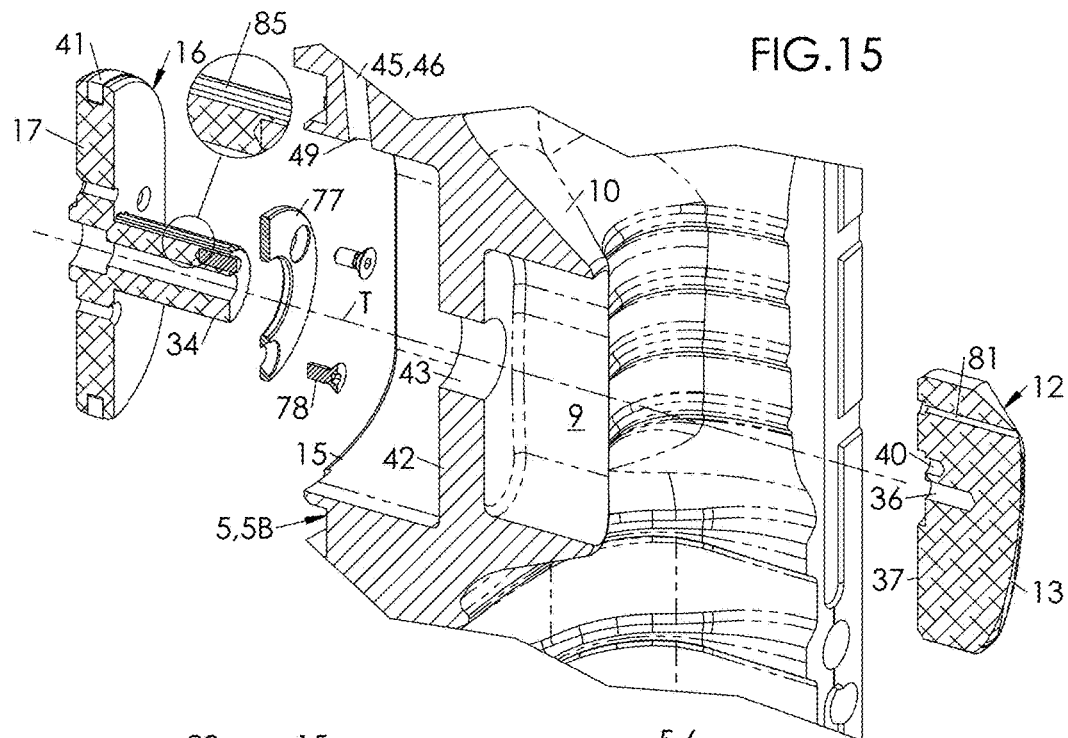
FIG. 15 is an exploded cutaway view in perspective showing, from the inside, a half-mold and its associated boxing device, according to a variant embodiment.

Illustrated in FIG. 11, FIG. 12 and FIG. 14 is the scaling of the parts of the molding unit 1 that makes it possible to form the hollow recess 3 in the container 2.

In this framework, the following are noted:
A the cumulative chord length, measured in a horizontal plane containing the transverse axis T, of the protrusion 10 and of the projection formed by the insert 12 in deployed position;
B the chord length, also measured in a horizontal plane containing the transverse axis T, of the projection formed by the insert 12 in deployed position beyond the protrusion 10;
C the width, measured horizontally (i.e., perpendicular to the main axis X), of the insert 12;
D the chord length, measured in a horizontal plane containing the axis T, of the protrusion 10, in retracted position of the insert 12;
E the maximum transverse extension (measured along the axis T) of the projection formed by the insert 12 beyond the protrusion 10;

F the maximum cumulative transverse extension (measured along the axis T) of the protrusion 10 and of the projection formed beyond the protrusion 10 by the insert 12 in deployed position;

F' the maximum transverse extension (measured along the axis T) of the protrusion 10 alone;

G the width, measured transversely, of the rear portion 4B of the body 4 (the width G is considered equally on the container 2 or on its impression in the mold 5);

H the travel of the insert 12 (or of the piston 17), measured in mm between the retracted position (in dashed lines in FIG. 11) and the deployed position (in solid lines in FIG. 11);

I on the container 2, the offset, measured in a horizontal plane, between the axis X (considered in the container 2) and the bottom of the hollow recess 3: in the mold 5, I corresponds approximately to the offset, measured in a horizontal plane, between the axis X (considered in the mold 5) and the transverse axis T.

The extensions E, F and F' are called "maximum" to demonstrate the case, as it is illustrated in FIG. 11, where the recess 3, and the protrusion 10 and the insert 12 do not exhibit symmetry in relation to a vertical plane containing the transverse axis T. This is why the extensions E and F are measured from the side of the insert 12 (or from the side of the protrusion 10) maximizing their value, as FIG. 11 illustrates it.

As has already been seen, the protrusion 10 forms a portion of the counter-impression of the hollow recess 3 in the container 2. In retracted position of the insert 12, the transverse extension F' of the protrusion 10 alone is such that between the facing protrusions 10, a gap persists whose width, measured transversely and denoted K, is sufficient to make possible, during the blow molding, the passing, during its expansion, of the preform from which the container 2 is formed. This width K is typically on the order of 40 mm.

This makes it possible to limit the travel H of the insert 12 and therefore the radial bulk of the boxing device 11, promoting the compactness of the molding unit 1.

In practice, the travel H of the insert 12 from its retracted position to its deployed position is small, i.e., it is less than or equal to 20 mm. Furthermore, this travel is advantageously greater than or equal to 10 mm. The travel H of the insert 12 is typically on the order of 15 mm.

The cumulative transverse extension F of the protrusion 10 and of the insert 12 in deployed position is such that, in deployed position of the two inserts 12, a gap persists between them, so that each hollow recess 3 is recessed. In other words, the handle formed in the container 2 by the two hollow recesses 3 back to back does not pass through, as illustrated in FIG. 14. The width, measured transversely, of the gap between the facing inserts 12 in deployed position is denoted J. This width J is typically on the order of 15 mm, which corresponds to the distance between the two hollow recesses 3 that together form the handle of the container 2.

The extensions E and F are such that E is less than or equal to 85% of F:

$$E \leq 0.85 \cdot F$$

Although limited, the projection formed beyond the protrusion 10 by the insert 12 in deployed position makes it possible to deepen the recess 3 despite a small travel H.

Furthermore, the recess 3 must be deep enough to facilitate the grasping of the container 2. For this purpose, the transverse extension E is advantageously greater than or equal to 30% of the cumulative transverse extension F:

$$E \geq 0.3 \cdot F$$

More specifically, the transverse extension E is preferably less than or equal to 35 mm:

$$E \leq 35 \text{ mm}$$

On the other hand, this transverse extension E is preferably greater than or equal to 10 mm:

$$E \geq 10 \text{ mm}$$

In addition, the transverse extension E is preferably less than or equal to 45 mm from which is subtracted the value of the offset I:

$$E \leq 45 \text{ mm} - I$$

Likewise, it is advantageous to limit the chord length B of the projection formed by the insert 12 in deployed position as a function of the cumulative chord length A of the protrusion 10 and of the projection formed by the insert 12.

Thus, B is preferably less than or equal to 80% of A:

$$B \leq 0.8 \cdot A$$

In this way, the amount of material that undergoes the stretching due to the boxing remains limited in vertical extension (along the axis X).

Furthermore, B is preferably greater than or equal to 35% of A:

$$B \geq 0.35 \cdot A$$

This makes it possible, in spite of everything, to stretch the material enough without, however, stretching it to the point of adversely affecting the visual appearance of it (the phenomenon of overstretching results in a whitish discoloration of the material).

It is also possible to scale the insert 12 by linking its chord length B to its width C.

Thus, the relation between the chord length B and the width C is advantageously less than or equal to 2.3:

$$B \leq 2.3 \cdot C$$

On the other hand, this relation is advantageously greater than or equal to 1.3:

$$B \geq 1.3 \cdot C$$

It is also possible to scale the insert 12 by linking its chord length B to its transverse extension E.

Thus, the relation between the chord length B of the projection formed by the insert 12 in deployed position and its transverse extension E is preferably less than or equal to 3.5:

$$B \leq 3.5 \cdot E$$

In contrast, this relation is advantageously greater than or equal to 2.2:

$$B \geq 2.2 \cdot E$$

More specifically, the chord length B of the projection formed by the insert 12 in deployed position is preferably less than or equal to 75 mm:

$$B \leq 75 \text{ mm}$$

In contrast, the chord length B of the projection formed by the insert 12 in deployed position is preferably greater than or equal to 50 mm:

$$B \geq 50 \text{ mm}$$

It can be advantageous to connect the cumulative chord length A to the cumulative transverse extension F.

More specifically, the relation between the cumulative chord length A to the cumulative transverse extension F is preferably less than or equal to 3.3:

$$A \leq 3.3 \cdot F$$

In contrast, this relation is advantageously greater than or equal to 2:

$$A \geq 2 \cdot F$$

In the table below, examples of ranges of values (in millimeters) are listed for the parameters A to J:

| Parameter | Minimum Value (Example) | Maximum Value (Example) |
|---|---|---|
| A | 80 | 120 |
| B | 50 | 75 |
| C | 25 | 40 |
| D | 60 | 100 |
| E | 10 | 35 |
| F | 30 | 50 |
| G | 45 | 70 |
| H | 10 | 20 |
| I | 0 | 45 |
| J | 14 | 25 |

To form a container 2, the procedure is as follows.

The first step is to introduce into the mold 5, in its open position, a blank previously heated to a temperature greater than the glass transition temperature of its material (typically, a blank of PET, whose glass transition temperature is on the order of 80° C., is heated to a temperature of about 120° C.). Each insert 12 is then in its retracted position.

The mold 5 is then closed, and a fluid (particularly air) under pressure (for example from about 7 to 15 bars) is injected into the blank, which is, preferably, simultaneously stretched by means of a sliding rod. Under the pressure, the material of the blank is brought to the vicinity of the lateral wall 6 and of the mold bottom 8, without, however, being applied there in a firm manner. As illustrated in FIG. 6 and FIG. 8, it is possible that, under the pressure, the material expands slightly into the pocket 9 while possibly partially being applied partially against the front surface 13 of the insert 12.

Each insert 12 is then moved toward its deployed position. For this purpose, a pressurized fluid (here, air at a high pressure, greater than or equal to 20 bars and typically on the order of 40 bars) is injected, via the primary duct 46 and the rear groove 23, into the rear half-chamber 22A, whereas the fluid present in the front half-chamber 22B is simultaneously evacuated, via the front groove 25, through the secondary duct 50. Under the pressure difference between the rear half-chamber 22A and the front half-chamber 22B, the piston 17 is, with the insert 12 with which it is integral, moved transversely in the direction of the cavity 7, until striking, by means of the front Silentbloc 77, against the partition 42, which thus determines the end of travel of the insert 12 in deployed position.

The insert 12 pushes the material back like a plunger (without, however, puncturing it) until reaching its deployed position, the handle then being formed hollow in the body 4 of the container 2 (FIG. 7 and FIG. 9).

At the same time as the insert 12 is moved toward its deployed position, the pressure in the container 2 is increased (typically up to a value of between about 20 and 40 bars) to improve the impression-taking of the container 2 against the lateral wall 6 and the mold bottom 8. Since the lateral wall 6 and the mold bottom 8 are thermally regulated, the holding of a close contact of the material against them promotes the cooling (or, in the case of a heat-setting, the heating) of the container 2, promoting its mechanical rigidity.

After a time lag (of several tenths of a second), the container is depressurized, the mold 5 is opened, and the container 2 is removed from the mold 5.

The insert 12 is placed back in its retracted position before or after the opening of the mold 5. For this purpose, the pressurized fluid is injected, via the secondary duct 50 and the front groove 25, into the front half-chamber 22B, whereas the fluid present in the rear half-chamber 22A is simultaneously evacuated, via the rear groove 23, by the primary duct 46. Under the pressure difference between the front half-chamber 22B and the rear half-chamber 22A, the piston 17 is, with the insert 12 with which it is integral, moved transversely toward the exterior of the mold 6, until striking, by means of the rear Silentbloc 76, against the back wall 18 that determines the end of travel of the insert 12 in retracted position.

By comparison with an ordinary boxing device in which the piston 17 would be directly mounted in a recess made in the mold 5, the presence of the added sleeve 14, which serves as a wearing part, limits (even eliminates) the wear of the lateral wall 6 of the mold 5, promoting the reliability of the molding unit 1.

Furthermore, the incorporation of the fluid circuit 45 in the mold 5, and more specifically the making of the supply ducts 46, 50 in the lateral wall 6 of the mold 5, with connections made on its upper surface 48, limits the transverse bulk of the mold 5, promoting the general compactness of the molding unit 1.

The separation of the recess 15 from the pocket 9 by the partition 42 and the mounting of the insert 12 from the inside of the half-mold 5A (or 5B) make it possible to achieve a good fluidtightness of the half-chambers 22A, 22B promoting the effectiveness of the boxing device 11, and therefore improving the quality of the container 2.

The asymmetric shape (here, oval) of the insert 12 and of the sleeve 14 prevents the rotation of the insert 12, promoting a good impression-taking of the hollow recess 3. The preferential uniform distribution of the openings 24 (and of the notches 26) makes it possible to ensure a good distribution of the pressure in the rear half-chamber 22A (or in the front half-chamber 22B), promoting the guiding precision of the insert 12 and a good impression-taking of the hollow recess 3.

A variant embodiment of the molding unit 1 has been represented in FIG. 15 to FIG. 18.

This variant contains all of the characteristics of the molding unit 1 described above, with the exception of the following additional or modified characteristics.

Firstly, the insert 12 is provided with at least one passage 81 that extends from a rear end 82, by which it opens into the pocket 9, to a front end 83 by which it opens onto the front surface 13.

According to a first embodiment, the (or each) passage 81 can be drilled in the periphery of the insert 12, in tunnel (or groove) form. According to a preferred embodiment illustrated in FIG. 15 to FIG. 18, the (or each) passage 81 is drilled in the body of the insert 12.

In this case, and as can clearly be seen in FIG. 18, the (or each) passage 81 opens onto the rear surface 37 of the insert 12.

According to an embodiment illustrated in FIG. 17 and FIG. 18, the insert comprises a plurality of passages 81. These passages 81 are advantageously distributed around the rod 34 when it is fastened onto the insert 12. In the example illustrated, where the insert 12 is provided with a counterbore 84, in which the rod 34 is fitted, it is seen that the passages 81 are distributed around this counterbore 84.

Secondly, the front half-chamber 22B is in fluid communication with the pocket 9.

For this purpose, the rod 34 is grooved, i.e., it is provided with grooves 85 made in its outer surface parallel to its axis (parallel to the axis T).

These grooves 85 facilitate the fluid communication between the front half-chamber 22B and the pocket 9.

These arrangements make it possible to achieve, via the front half-chamber 22B, the grooves 85, the pocket 9 and the passage (or passages) 81, a circulation of fluid (i.e., air if the fluid used is air) that:

facilitates the cooling (or the thermal regulation) of the insert 12, facilitates the cooling of the material of the container 2 as well as its separation from the front surface 13 of the insert 12 when it is withdrawn.

Figure 16:
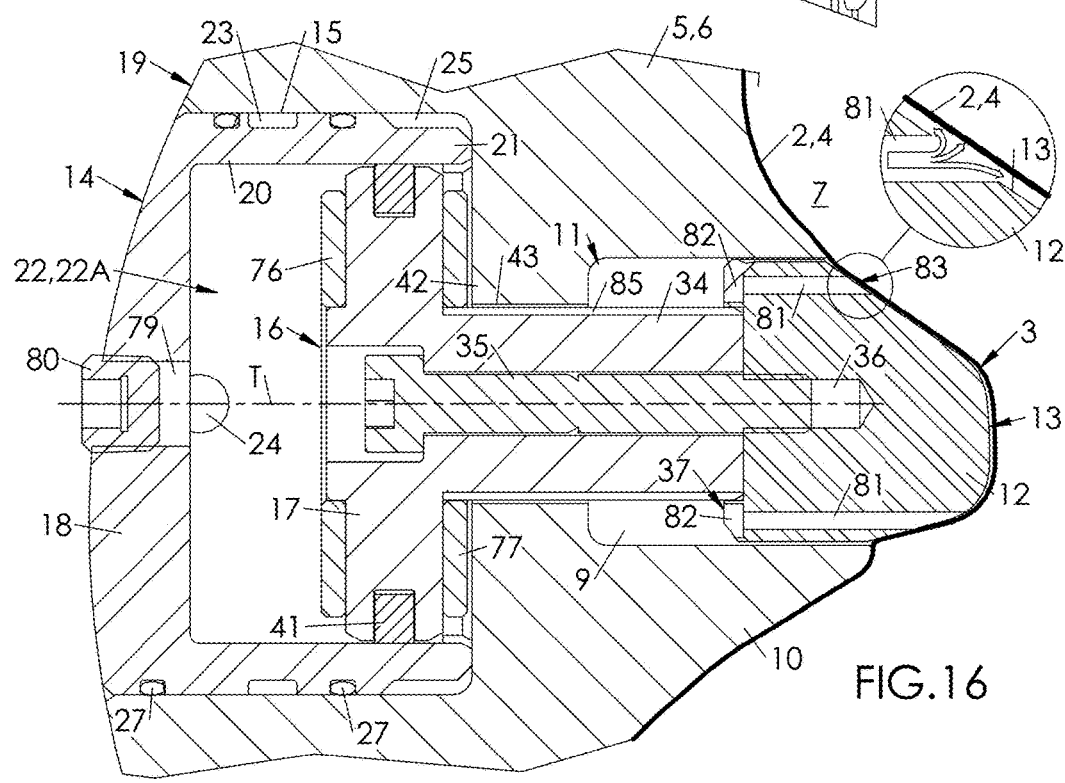
FIG. 16 is a horizontal detail cutaway view showing the boxing device of FIG. 15 in deployed position of the insert.

This fluid circulation is achieved during the injection of fluid into the front half-chamber 22B controlling the retraction movement of the piston 17 (and therefore of the insert 12): a portion of the injected fluid leaks into the pocket 9 via the grooves 85 and is introduced into the passage (the passages) 81 by the rear end 82 to come out on the front surface 13 by the front end 83, as illustrated by the arrows in the detail inset of FIG. 16.

By limiting the heating of the insert 12, at the same time as the lateral wall 6 of the mold 5 is cooled, there is avoided, on the one hand, the rise in the temperature of the insert above the glass transition temperature (Tg) of the constituent thermoplastic material of the container and, on the other hand, an expansion of the insert 12 that would hinder its proper sliding into the pocket 9. The sheet of air created between the front surface 13 of the insert 12 and the container 2 makes it possible to maintain the shape of the hollow recess 3 formed in the container 2 by the insert 12 in its deployed position.

More specifically, the injection of fluid at low pressure into the front half-chamber 22B (and therefore into the pocket 9) is achieved before the injection of fluid at high pressure into the rear half-chamber 22A is stopped. The fluid circulation on the front surface 13 of the insert 12 therefore begins before its retraction. Consequently, the air circulates between the blow-molded container 2 and the insert 12 and ensures a cooling thereof.

The pressure in the container 2 is then released, and then the pressure in the rear half-chamber 22A is also released. Since the pressure in the front half-chamber 22B is maintained, the insert 12 is moved from its deployed position toward its retracted position and then the pressure in the front half-chamber 22B is released.

This structural design, and the operating method that has just been described, makes it possible to simplify the structure of the mold since the pressurization ducts of the front half-chamber 22B are used to ensure the cooling of the insert 12, which prevents resorting to dedicated arrangements (for example, a specific duct for supplying coolant). Furthermore, since the container 2 is used to create a wall effect for guiding the air flows that are distributed in sheets licking the front surface 13, this leads to a good effectiveness of the cooling. Accordingly, the temperature of the insert 12 can be kept constantly below the glass transition temperature of the material of the container 2.

The invention claimed is:

1. Molding unit (1) for the forming of a container (2) provided with a recess (3) formed hollow toward the interior of the container (2), this molding unit (1) comprising:
    a mold (5) provided with a lateral wall (6) defining a cavity (7) having the impression, at least partial, of the container (2), this lateral wall (6) being provided with a pocket (9) that comes out into the cavity (7);
    a boxing device (11) comprising:
        an insert (12) mounted in translation relative to the lateral wall (6) along a transverse axis (T) between a retracted position in which the insert (12) is at least partially retracted into the pocket (9), and a deployed position in which the insert (12) projects at least partially into the cavity (7) outside of the pocket (9),
        an actuator (16) integral with the insert (12) and provided with a piston (17); wherein:
    the boxing device (11) comprises an added sleeve (14), mounted in a complementary recess (15) made in the lateral wall (6) and attached to it, and in which the piston (17) is mounted in translation, the sleeve (14) defining a chamber (22) subdivided by the piston (17) into a rear half-chamber (22A) and a front half-chamber (22B);
    the recess (15), the sleeve (14) and the piston (17) are rotationally asymmetric around the transverse axis (T);
    the boxing device (11) comprises a fluid circuit (45) for controlling the movement of the piston (17), which includes at least one primary duct (46) for supplying the rear half-chamber (22A), which communicates with it by several openings (24) in the sleeve (14), which are distributed on its periphery.

2. Molding unit (1) according to claim 1, wherein the recess (15), the sleeve (14) and the piston (17) are taller than they are wide.

3. Molding unit (1) according to claim 1, wherein the recess (15), the sleeve (14) and the piston (17) have an oval profile with an approximately vertical major axis.

4. Molding unit (1) according to claim 1, wherein the sleeve (14) comprises at least two diametrically opposite openings (24) along a vertical axis.

5. Molding unit (1) according to claim 1, wherein the sleeve (14) comprises four openings (24) distributed at 90° around the transverse axis (T).

6. Molding unit (1) according to claim 1, wherein the sleeve (14) comprises a back wall (18) and a cylinder (20) that projects from the back wall (18) and ends by an edge (21), the back wall (18) and the cylinder (20) defining the chamber (22) on the inside.

7. Molding unit (1) according to claim 6, wherein the sleeve (14) is provided, on an outer peripheral surface of the cylinder (20), with a rear groove (23) that opens into the chamber (22) by the openings (24), and wherein the primary fluid duct (46) is made In the wall (6) of the mold (5) and opens into the recess (15) in line with the rear groove (23).

8. Molding unit (1) according to claim 6, wherein the fluid circuit (45) for controlling the movement of the piston (17) includes a secondary duct (50) for supplying the front half-chamber (22B), which communicates with it by notches (26) made in the edge (21).

9. Molding unit (1) according to claim 8, wherein the sleeve (14) is provided, on an outer peripheral surface of the cylinder (20), with a front groove (25) that opens into the chamber (22) by the notches (26), and wherein the secondary fluid duct (50) is drilled into the wall (6) of the mold (5) and opens into the recess (15) in line with the front groove (25).

10. Molding unit (1) according to claim 1, wherein the recess (15) is separated from the pocket (9) by a partition (42) drilled with a hole (43), and wherein the actuator (16) is provided with a rod (34) mounted in translation in this hole (43) and onto which the insert (12) is fastened.

11. Molding unit (1) according to claim 10, wherein the insert (12) is fastened onto the rod (34) by screwing.

12. Molding unit (1) according to claim 11, wherein the insert (12) is fastened onto the rod (34) by means of a screw (30) going through the piston (17) and the rod (34) and helically engaging with a threaded hole (36) made in a rear surface (37) of the insert (12).

13. Molding unit (1) according to claim 10, wherein the insert (12) is locked In rotation relative to the actuator (16) by means of a pin (38).

14. Molding unit (1) according to claim 1, wherein the or each fluid duct (46, 50) comes out on an upper surface (48) of the mold (5).

15. Molding unit (1) according to claim 1, wherein the boxing device (11) comprises a pair devices for shock absorption (76, 77), fastened onto the actuator (16) on both sides of the piston (17).

16. Molding unit (1) according to claim 15, wherein the devices for shock absorption are made of polyurethane.

17. Molding unit (1) according to claim 1, wherein the sleeve (14) is fastened onto the lateral wall (6) of the mold (5) at least by means of a bracket (28), comprising a body (29) attached to the mold (5) by screwing, and by means of a tongue (31) projecting from the body (29) and resting against an outer surface of the sleeve (14).

18. Molding unit (1) according to claim 1, wherein the sleeve (14) is made of steel.

19. Molding unit (1) according to claim 1, wherein the actuator (16) is made of aluminum.

20. Molding unit (1) according to claim 1, further comprising a pair of symmetric boxing devices (11) whose inserts (12) are placed opposite one another.

\* \* \* \* \*